(12) United States Patent
Cormont et al.

(10) Patent No.: US 9,138,859 B2
(45) Date of Patent: Sep. 22, 2015

(54) METHOD FOR MANUFACTURING AN OPTICAL COMPONENT FOR ELIMINATING SURFACE DEFECTS

(75) Inventors: Philippe Cormont, Le Bouscat (FR); Jean-Luc Rullier, Gujan-Mestras (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 13 days.

(21) Appl. No.: 14/129,621

(22) PCT Filed: Jun. 29, 2012

(86) PCT No.: PCT/FR2012/051506
§ 371 (c)(1),
(2), (4) Date: Dec. 27, 2013

(87) PCT Pub. No.: WO2013/004955
PCT Pub. Date: Jan. 10, 2013

(65) Prior Publication Data
US 2014/0113528 A1 Apr. 24, 2014

(30) Foreign Application Priority Data

Jul. 1, 2011 (FR) ..................................... 11 55971

(51) Int. Cl.
*B24B 1/00* (2006.01)
*B24B 37/04* (2012.01)
(Continued)

(52) U.S. Cl.
CPC .............. *B24B 51/00* (2013.01); *B23K 26/0075* (2013.01); *B23K 26/0081* (2013.01);
(Continued)

(58) Field of Classification Search
CPC .......... B24B 49/00; B24B 49/12; B24B 1/00; B24B 7/04; B24B 37/005; B24B 37/04; B24B 37/042; B24B 37/30; B24B 13/00; B24B 13/0018; C03B 29/02; C03C 23/0025; B23K 26/0081

USPC .................. 451/6, 10, 11, 37, 41, 54, 57, 287
See application file for complete search history.

(56) References Cited

U.S. PATENT DOCUMENTS 3,914,145 A 10/1975 Forler et al.
4,047,863 A 9/1977 McCluskey et al.
(Continued)

FOREIGN PATENT DOCUMENTS

EP 0196730 A1 10/1986
EP 0535620 A1 4/1993
(Continued)

OTHER PUBLICATIONS

Suratwala et al., "Effect of rogue particles on the sub-surface damage of fused silica during grinding/polishing", Journal of Non-Crystalline Solids, 2008.

*Primary Examiner* — Eileen Morgan
(74) *Attorney, Agent, or Firm* — Young & Thompson

(57) ABSTRACT

Method for manufacturing an optical component, including a substrate made of a fusible material, includes the following steps a) and b) of steps a), b) and c), or steps a), b), c) and d): a) roughing; b) fine grinding; c) polishing; and d) finishing. The method includes steps, subsequent to any one of steps b), c) and/or d): e) inspecting the optical surface of the optical component; f) detecting and locating at least one surface defect to be eliminated; g) for each surface defect, applying a laser beam to an area emcompassing the defect, so as to produce a local remelting of the fusible material, and to form, at the location of the defect, an area of material remelted; h) polishing the optical surface including at least one area of remelted material, to produce a polished optical surface free of surface defects, and continuing with steps c) and d).

14 Claims, 4 Drawing Sheets

Figure 1:
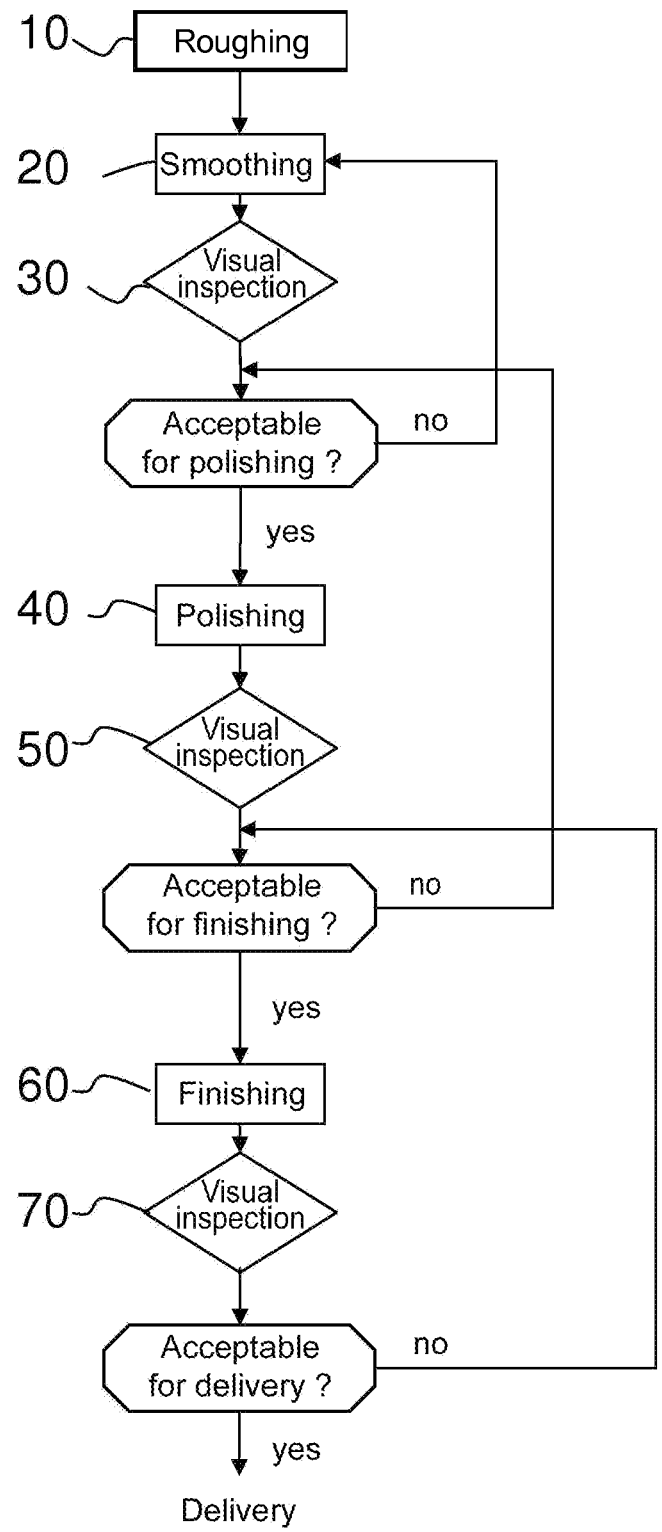

(51) Int. Cl.
  *B24B 13/00* (2006.01)
  *B24B 51/00* (2006.01)
  *B23K 26/00* (2014.01)
  *C03B 29/02* (2006.01)
  *C03C 19/00* (2006.01)
  *C03C 23/00* (2006.01)
  *B23K 26/03* (2006.01)

(52) U.S. Cl.
  CPC ............... *B23K26/032* (2013.01); *B24B 13/00* (2013.01); *C03B 29/02* (2013.01); *C03C 19/00* (2013.01); *C03C 23/0025* (2013.01)

(56) References Cited

U.S. PATENT DOCUMENTS

| | | |
|---|---|---|
| 4,731,254 A | 3/1988 | Heineken et al. |
| 7,413,832 B2 * | 8/2008 | Koike et al. ............... 430/5 |
| 8,400,630 B2 * | 3/2013 | Hemsendorf et al. ...... 356/239.1 |
| 8,836,936 B2 * | 9/2014 | Lin ............... 356/239.8 |
| 2002/0046998 A1 | 4/2002 | Hackel et al. |
| 2002/0185611 A1 | 12/2002 | Menapace et al. |
| 2003/0205831 A1 | 11/2003 | Rawlins et al. |
| 2004/0154646 A1 | 8/2004 | Hong |
| 2009/0188899 A1 | 7/2009 | Bouchut et al. |
| 2009/0220864 A1 * | 9/2009 | Tanabe ............... 430/5 |
| 2012/0180526 A1 | 7/2012 | Cormont et al. |

FOREIGN PATENT DOCUMENTS

| | | |
|---|---|---|
| EP | 1473143 A1 | 11/2004 |
| FR | 2896794 A1 | 8/2007 |
| JP | 2000117605 A | 5/2000 |
| JP | 2001239454 A | 9/2001 |
| WO | 0024567 A1 | 5/2000 |
| WO | 0183163 A2 | 11/2001 |
| WO | 2011033234 A1 | 3/2011 |

* cited by examiner

METHOD FOR MANUFACTURING AN OPTICAL COMPONENT FOR ELIMINATING SURFACE DEFECTS

The present invention relates to the manufacturing of optical components such as lenses, blades or prisms. More precisely, the present invention relates to a method of manufacturing optical components having an excellent quality of optical surface, comprising the elimination of at least one surface defect of an optical component. The invention also relates to a method of surface treatment of a glass optical component so as to eliminate the surface defects of unacceptable size for the final use of the optical component, whatever the shape of this optical surface.

The manufacturing of glass optical components conventionally includes a roughing step, a smooth grinding step, followed with one or more polishing steps and possibly one finishing step. The trueing consists in shaping the glass material to the dimensions required for the optical component and in machining the optical surface(s) to the desired shape: planar, concave, convex, spherical or aspheric. The smooth grinding or smoothing aims to reduce the roughness of the optical surface of the glass before the polishing step. The polishing step further reduces the roughness of the optical element so as to make it transparent and gives the almost-final flatness quality. The finishing step may be performed to improve one or several optical qualities, such as its roughness, its flatness or its flow resistance. The finishing step is a post-polishing process that may be implemented in various ways: robotic local polishing, ion-beam local polishing, magneto-rheological (MRF) polishing, super-polishing, chemical etching.... This sequence of manufacturing steps thus allows reducing regularly the roughness of the optics with steps whose material removal speeds are lower and lower. The average surface roughness is lower than 200 nanometers after the smoothing and lower than 2 nanometers after the polishing. The material removals decrease at each step: during the roughing, the thickness of material removed on each face is higher than 500 microns ($\mu$m); during the smoothing, it is comprised between 50 and 500 $\mu$m; during the polishing, between 10 and 100 $\mu$m, and finally, the thickness of material removed in the finishing step is lower than 10 $\mu$m per face. During the smoothing and/or polishing steps, surfaces imperfections such as scores, scratches, pits or chips may appear. Such surface defects may also come from manufacturing steps upstream of the polishing if the material removals have not been sufficient during the smoothing. But, even for correctly controlled manufacturing processes, it may happen that non-desired particles come between the optical component and the polishing tool. Such particles may be agglomerates of the polishing product, polishing tool scraps, or also dust from the environment. The size of the surface defects then depends on the size and the nature of these particles, as described in the publication ("Effect of rogue particles on the sub-surface damage of fused silica during grinding/polishing", T. Suratwala, Journal of Non-Crystalline Solids 354 (2008) p. 2023-2037).

For the optical components of good quality, the sizes of the surface imperfections considered are of the order of a few micrometers to a few tens of micrometers widthwise and up to several millimeters lengthwise. The depth of the considered defects is lower than 20 micrometers. The defect density varies from a few 0.01 defect/$cm^2$ to several tens per $cm^2$ according to the quality of manufacturing and to the size of the optical components.

The surface defects diffract or scatter the light and may also affect the durability of the optical element, whatever the use thereof. The optical element or the optical unit, one face of which has surface defects, then loses a part of its qualities for light beam transportation. For the applications with a power laser beam, the surface imperfections have to be limited in number and in size because such imperfections are at the origin of far more extended damages liable to limit the transmission of the optical component.

The patent EP0196730 describes a method for repairing the surface deteriorations during glass bottle recycling, i.e. after the manufacturing and the use thereof. According to this method, a laser beam of 0.7 mm of diameter sweeps the entire surface of a glass bottle, to bring the surface of the glass to a temperature of 500-600° C. The surface temperature being higher than the glass softening temperature, this leads to locally remelt the outer surface of the bottle and thus to eliminate the defects with a depth higher than 10 microns. The patent US2004/154646 describes a method for repairing a glazing so as to remove surface defects such as scores of 10 $\mu$m to 0.1 mm deep. The method comprises a step of local remelting of a face of the glass by an exposition to a source of heat over an area of several square millimeters. However, such techniques of remelting a glass surface induce surface deformations that are not compatible with the optical surface qualities demanded for the optical systems used, for example, in a power laser chain.

Different methods exist for repairing the scores having sizes of the order of the millimeter on the windows or portholes that do not require such a surface flatness than that which is necessary for the applications of precision optics. For example, the patents EP1473143, US2003/205831, U.S. Pat. No. 4,047,863, U.S. Pat. No. 3,914,145 and WO2000/024567 describe certain of such methods. Such methods allow obtaining the desired visual effect and possibly reinforcing the strength of the window, but they cannot in any way be applied to precision optical components because the solutions proposed deform the wave surface transmitted by the optics due either to the local surface modifications or to the material index change induced by the treatment.

On the other hand, many studies have been performed on the methods of polishing for the purpose of reducing the surface defects of optical components. Hence, the patents JP2000-117605, WO2001/083163 and JP2001-239454 propose surface polishing methods that reduce the number of defects. However, these methods force the manufacturer of optical components to change its manufacturing process and polishing tools, which can be performed but to the detriment of the other performances previously obtained, such as the surface flatness.

The patents US 2002/0046998 and FR2896794 propose efficient methods for increasing the strength of the optical surfaces to a power laser flow. However, these methods have for drawback to reduce the flatness of the optical surface and to require additional operations for making appear the damages after the manufacturing of the optical component.

In manufacturing of optical components, it is generally attempted to correct the surface defects appearing during the manufacturing with the same tools as those used for the manufacturing, i.e. the polishing machines, combined with higher-quality polishing products (polishing paste with finer and finer grain, for example). The most used technique for correcting surface imperfections of an optical component consists in removing a thickness of material at least equivalent to the depth of the defect. In order not to deform the surface, this removal has to be uniform over the whole surface. Now, the removal to be performed is all the more significant that the defect is deep. On optical components having defects whose depth is too great with respect to the usually performed removals, it may then be necessary to resume the manufacturing at the preceding step. Hence, the final polishing step removes a thickness of a few micrometers. Now, if a score appears during this polishing step and if this score has a depth of one or several tens of micrometers, it is then necessary to resume the optical component at the preceding polishing step that produces removals of several tens of micrometers. The result is not guaranteed because new defects are often created during this significant removal. Each step of manufacturing and of polishing uses different products and, sometimes, different machines. These manufacturing cycles may thus be long and are not predictable. Moreover, the material removal speeds highly decrease after the roughing steps. They go from a few hundreds of micrometers per minute for the smoothing, just after the roughing, to speeds as slow as a few micrometers per hour. Finally, when limits exist on the minimal thickness of the component, it is sometimes impossible to repolish without going below the minimal dimension.

One object of the invention is to propose a method for manufacturing an optical component whose defects non tolerable for the final target application have been eliminated.

Another object of the invention is to shorten the duration of manufacturing of an optical component, while improving the optical surface quality of this component, i.e. reducing the density of surface defects and/or the size of the surface defects. Another object of the invention is to propose a method for correcting the surface defects of an optical component having a planar, concave or convex optical surface. Still another object of the invention is to propose a method of hardening an optical component intended to be exposed to a power laser radiation.

The present invention has for object to remedy the drawbacks of the prior art methods and more particularly relates to a method of manufacturing an optical component comprising a substrate made of a fusible material, said method comprising the following steps a) and b) or steps a), b) and c) or steps a), b), c) and d):

a. Roughing the optical component to form at least one optical surface on said substrate;

b. Smooth grinding said optical surface of the optical component so as to obtain a smoothed optical surface;

c. Polishing said smoothed optical surface so as to obtain a polished optical surface;

d. Finishing said polished optical surface so as to obtain a finished optical surface.

According to the invention, the method comprises, after any one of steps b), c) and/or d), the following steps:

e. Inspecting the smoothed, polished or finished optical surface of the optical component to detect and locate at least one surface defect to be eliminated on the smoothed, polished or finished optical surface of the optical component;

f. For each surface defect to be eliminated located at step e), applying a laser beam over an area encompassing said surface defect to be eliminated, said laser beam having a laser emission wavelength suitable for being absorbed by said material, so as to produce a local remelting of the fusible material, the power density of the laser beam and the duration of application of the laser beam being function of the transverse dimensions of the surface defect to be eliminated, so as to form, in place of the surface defect to be eliminated, an area of laser remelted material, g. Continuing the method of manufacturing the optical component at step c) when step f) has been performed before the end of step c); or, respectively, at step d) when step f) has been performed after the end of step c).

According to various particular aspects of the method of manufacturing of the invention:

step e) of inspection of the optical surface of the optical component comprises a chemical etching;

step e) of inspection comprises an optical measurement of scattering and/or diffraction;

step e) of inspection comprises the detection and location of at least one surface defect having a transverse dimension greater than or equal to 10 microns on the optical surface;

step f) of application of a laser beam comprises the application of a $CO_2$ laser beam at a wavelength of 10.6 µm, said laser being continuous or pulsed, the fusible material is glass and step f) of applying a laser beam causes an increase of the local temperature of the glass, said local temperature of the glass being comprised between 1000K and 2000K in an area encompassing said surface defect to be eliminated located at step e);

step f) is combined to a spatial sweep of the laser beam over the surface of the optical component along the surface defect to be eliminated;

the polishing step that follows step f) comprises a material removal over a thickness lower than the depth of the initial surface defect and higher than or equal to the depth of the surface deformations of the area of laser remelted material generated by step f) of application of the laser beam;

the material removal during the polishing step that follows step f) is comprised between 1 and 20 microns.

The invention also relates to a method of hardening with respect to power laser radiations an optical component comprising a substrate made of a fusible material, said substrate comprising a polished or finished optical surface, said hardening method comprising the steps of:

h. Inspecting the polished or finished optical surface of the optical component to detect and locate at least one surface defect to be eliminated on the optical surface of the optical component;

i. For each surface defect to be eliminated located at step h), applying a laser beam over an area encompassing the surface defect, said laser beam having a laser emission wavelength suitable for being absorbed by said material, so as to produce a local remelting of the fusible material, the power density of the laser beam and the duration of application of the laser beam being function of the transverse dimensions of the surface defect to be eliminated located at step h), so as to form, in place of the surface defect to be eliminated, an area of laser remelted material;

j. Resuming the method of manufacturing the optical component at step c) of the method of claim 1 when step i) has been performed before the end of step c); or, respectively, at step d) of the method of claim 1 when step i) has been performed after the end of step c).

The invention will find a particularly advantageous application in the manufacturing of optical components of great precision on a glass substrate, intended in particular to be used in a power laser chain.

The present invention also relates to the characteristics that will be revealed by the following description and that will have to be considered alone or according to any technically possible combination thereof.

Figures 2A, 2B:
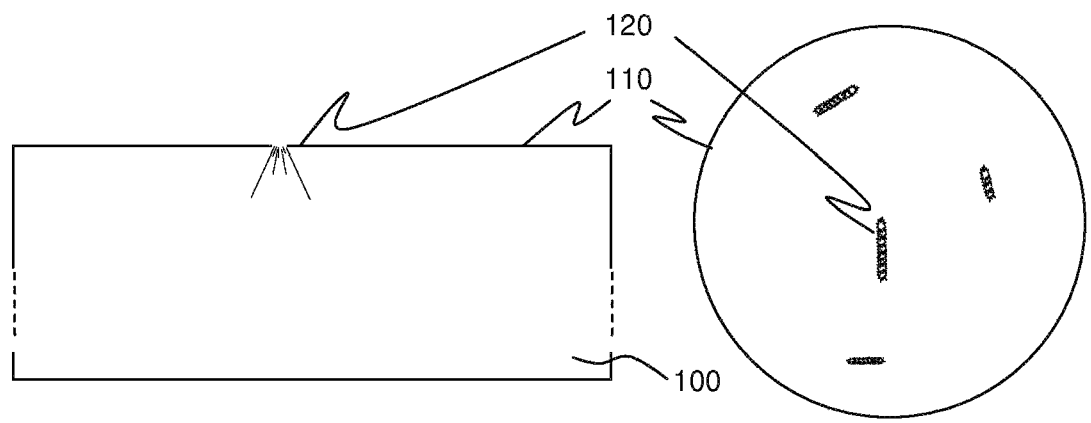
Figure 7:
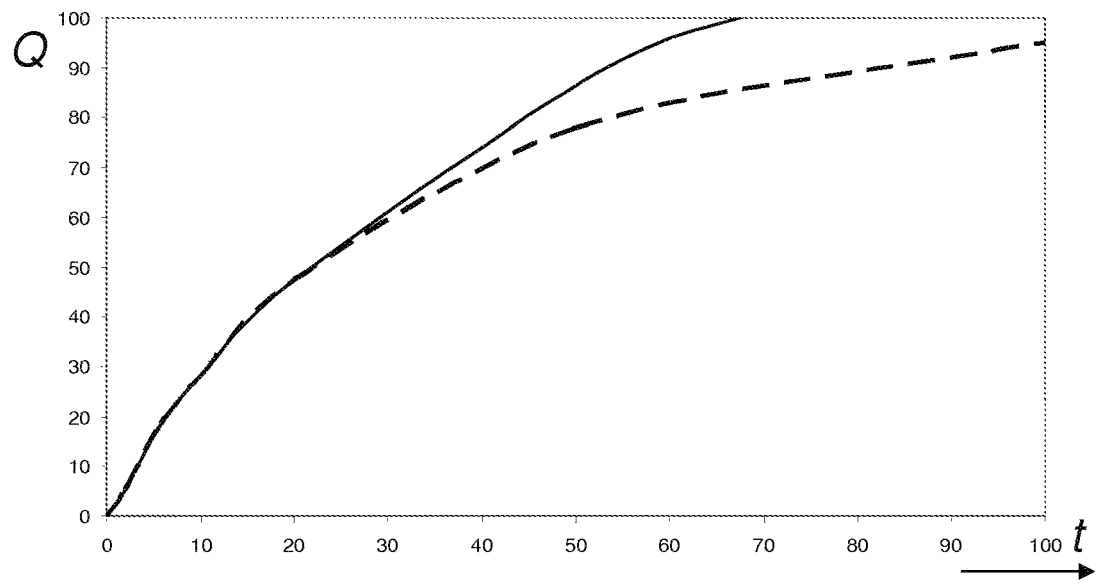
Figure 3:
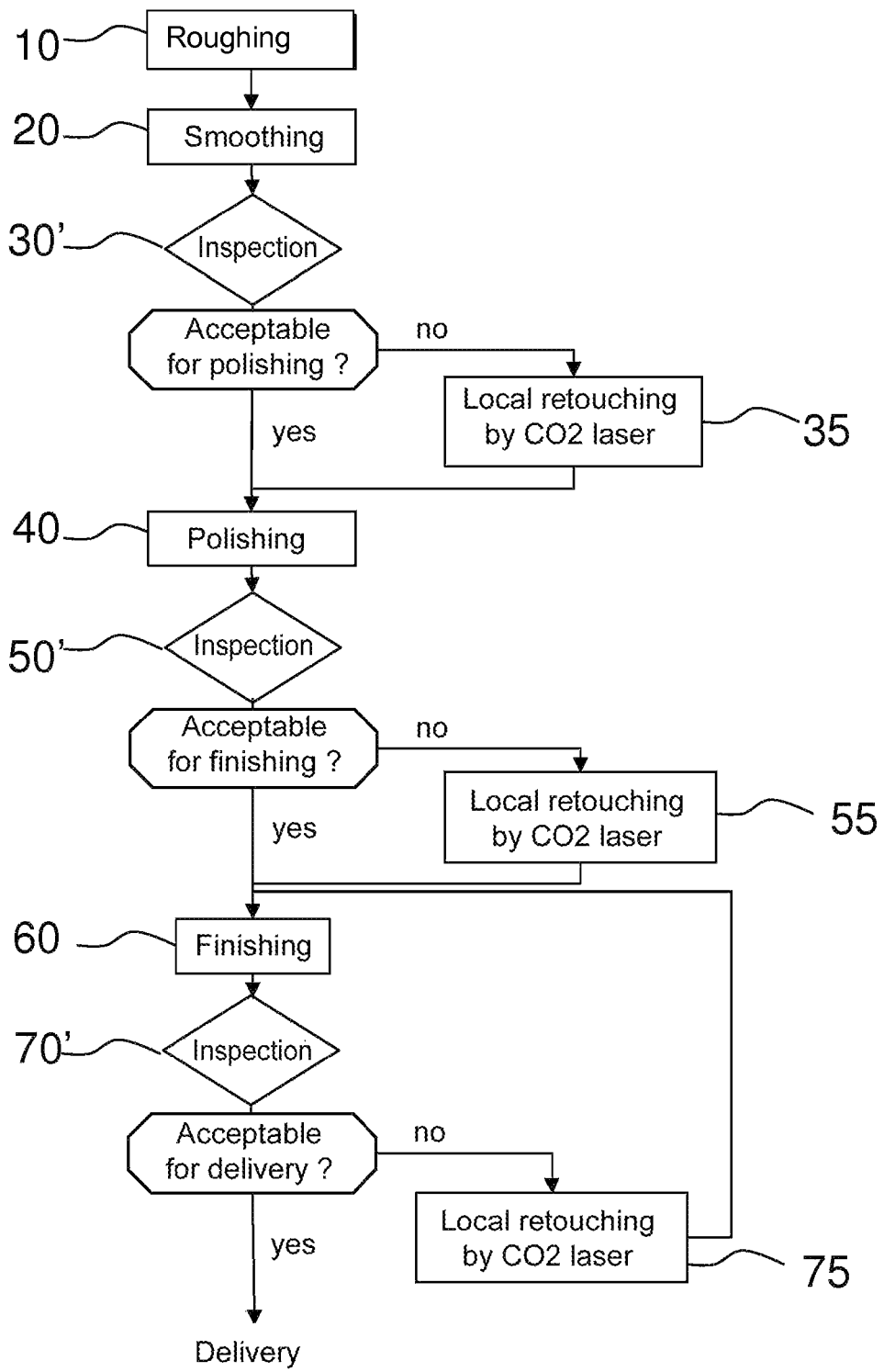
Figure 4:
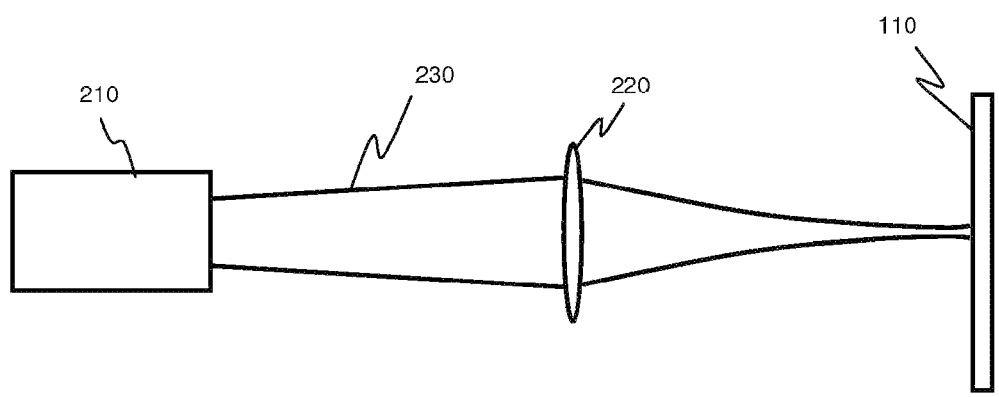
Figures 5A, 5B:
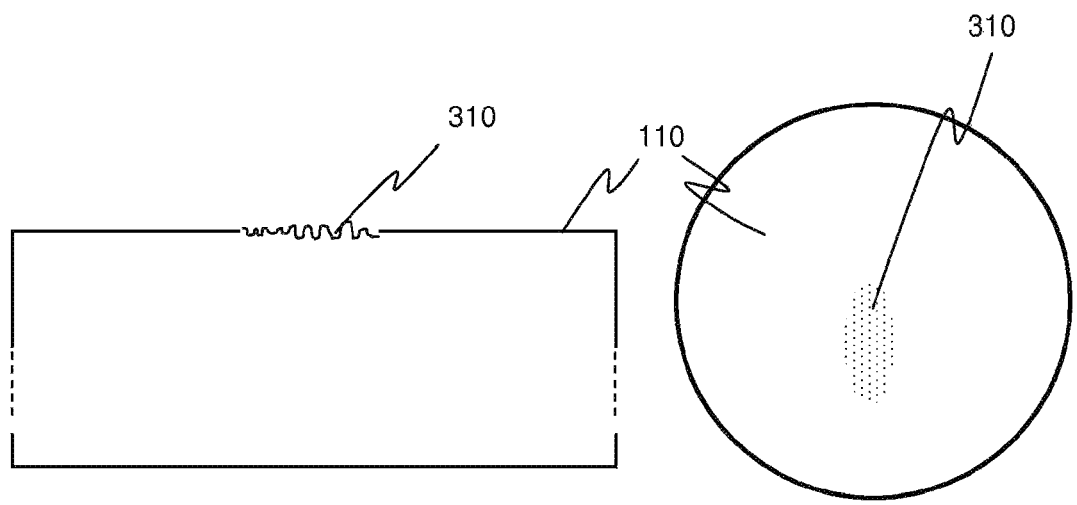
Figures 6A, 6B, 6C:
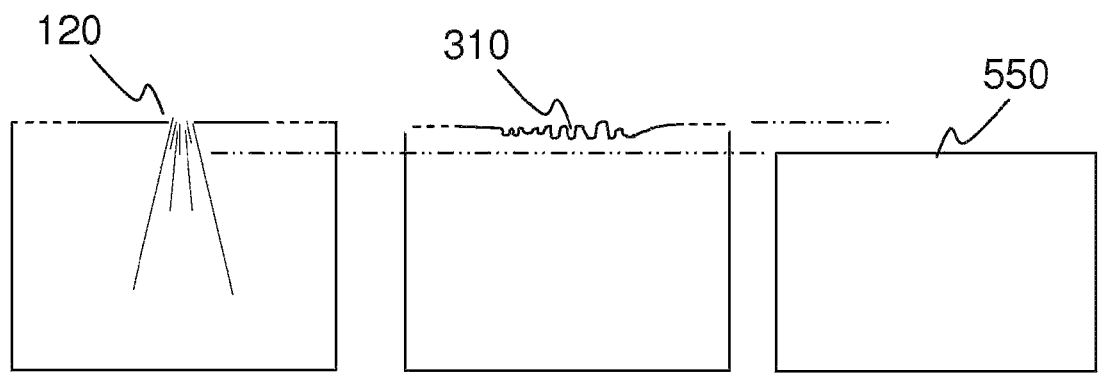

This description, given by way of non-limitative example, will allow a better understanding of how the invention can be implemented, with reference to the appended drawings, in which:

FIG. 1 schematically shows the steps of a method of manufacturing an optical component according to the prior art;

FIG. 2 schematically shows a sectional view (FIG. 2A) and a top view (FIG. 2B) of an optical component having surface defects;

FIG. 3 schematically shows the steps of a method of manufacturing an optical component according to the invention;

FIG. 4 schematically shows a view of a part of the device for locally remelting the surface defects of an optical component;

FIG. 5 schematically shows a sectional view (FIG. 5A) and a top view (FIG. 5B) of the same optical component as that of FIG. 2, after a step of local remelting of a surface defect;

FIG. 6 schematically shows a sectional view of an optical component during the main steps of the method according to an embodiment of the invention, FIG. 6A shows a first step of polishing and locating a surface defect, FIG. 6B shows the area of laser remelted material generated following the local remelting of the defect of FIG. 6A, and FIG. 6C shows the optical surface of the optical component after the polishing step;

the curve of FIG. 7 schematically shows a measurement of the optical quality of the optical surface of an optical component as a function of the duration of the method of manufacturing, according to the manufacturing technique of the prior art (dash-line curve) or according to the method of the invention (full-line curve).

FIG. 1 schematically shows a diagram representing the last steps of a conventional method of manufacturing an optical component, which is an iterative method. The steps for manufacturing the material serving as a substrate for the optical component are not detailed herein. The substrate is generally made of glass. The step 10 is a roughing step, where the first shape is given to the glass material intended to manufacturing an optical component. The optical component is roughed in such a manner to be shaped to the required dimensions and so as to machine the optical surface according to the desired shape: planar, concave, convex, spherical or aspheric. However, the roughing generates a scattering optical surface with a high surface roughness. The following step 20 is a smoothing step whose purpose is to reduce the roughness of the optical surface of the glass, for example by grinding this surface by means of a smoothing machine and specific products. Several times, during the manufacturing and before delivering an optical component, the manufacturer performs a visual inspection of the surfaces and checks for the presence of defects. To perform the polishing and finishing steps of manufacturing, a criterion of surface quality is defined before starting the step. This criterion is based on the size and the number of defects detected. The more the optical component progresses in the manufacturing, the more severe is the criterion, i.e. the acceptable defects are smaller and smaller. If the input criterion of the step is fulfilled, the component can perform the step and, if not, it must be verified that the component responds to the input criterion of the previous step. After a first smoothing step 20, the manufacturer performs a first visual inspection 30 of the smoothed optical surface and checks for the presence of defects. If defects are present on the smoothed optical surface and make the optical component non-compliant, the manufacturer repeats the smoothing step 20 until the density and/or the size of the defects on the smoothed optical surface is compliant with the polishing input quality criterion predefined for the optical component. When the quality of the smoothed optical surface of the optical component fulfills the polishing input quality criterion, the smoothed optical component is compliant. The following polishing step 40 is carried out, the purposes of which are to make the optical surface perfectly smooth and to have the shaping with the necessary precision, to eliminate the scattering and to increase the reflection/transmission coefficients on the optical surface. After a first polishing step 40, the manufacturer performs a visual inspection 50 of the polished optical surface and checks for the presence of defects. If the finishing input criterion is fulfilled, the component may proceed to the finishing step 60. If it is not the case, and if the polishing input criterion is fulfilled, the component remains at the polishing step 40. If the polishing criterion is not fulfilled, the component returns to the smoothing step 20. The finishing step 60 allows a significant reduction of the roughness. It uses optimized polishing parameters (fine grain size distribution of the polishing agents, chemical control of the fluids, cleaned environment) with small removals of material. The finishing step may be, for example, a super-polishing and/or a MRF polishing. After a first finishing step 60, the manufacturer performs a visual inspection 70 of the polished optical surface and checks for the presence of defects. As long as the component is not compliant with the final specifications of delivery, the optical component remains in manufacturing. If the finishing input criterion is fulfilled, the component remains at the finishing step 60. If it is not the case, and if the polishing input criterion is fulfilled, the component returns to the polishing step 40. If the polishing criterion is not fulfilled, the component returns to the smoothing step 20.

It is observed that the conventional method of manufacturing an optical surface of an optical component is an iterative method. The visual control is a determining step in the progression of the optical component manufacturing. Each visual inspection step 30 or 50 or 70 determines the following of the operations, and may lead to a backward progression in the manufacturing process. The manufacturing method of FIG. 1 requires as many smoothing, polishing and finishing operations as the criterion of optical quality is high. Hence, the cost of the optical components highly depends on the quality criterion demanded. Moreover, despite the iteration of the number of smoothing, polishing and/or finishing steps, the optical surface quality does not increase indefinitely but reaches a limit. It exists no optical component having an absolutely perfect optical surface quality relative to an optical wave front.

FIG. 2 schematically shows a sectional view (FIG. 2A) and a top view (FIG. 2B) of an optical component 100 comprising an optical surface 110. The glass optical component has surface defects 120 that may be highlighted, for example, during the step 30 of visual inspection after smoothing, or during the step 50 of visual inspection after polishing. The optical component 100 may be intended to be used in reflection on the optical surface 110 (reflecting mirror, the optical surface 110 being possibly covered with a reflecting thin layer) or in transmission, wherein the component 100 can be a focusing lens.

A method of manufacturing will now be described in detail, which allows obtaining an optical component whose optical surface has no unacceptable defects, i.e. an optical component with no defects having transverse dimensions higher than a pre determined criterion, which is function of the intended use of the optical component.

FIG. 3 schematically shows the diagram of the method of manufacturing according to a preferred embodiment of the invention. After the roughing step 10, similar to that of the prior art detailed in reference with FIG. 2, the optical surface has a high surface roughness. A smoothing step 20 is then performed so as to obtain a smoothed optical surface, in a conventional manner. A step 30' of inspection of the smoothed optical surface is then performed. The inspection step 30' may be a step of visual inspection, or a step of automatic inspection, for example an optical inspection by means of a camera or a microscope and a suitable lighting. Various methods of inspection may be implemented within the framework of the invention: optical scattering inspection, thermo luminescence, chemical etching to make the defects visible . . . . The finality of the inspection step 30' is to determine the position and the size (length and width) of the surface defects 120 on the smoothed optical surface. If at least one defect 120 is present on the smoothed optical surface and makes the component non-compliant, instead of proceeding to a new smoothing step, the optical component 100 is directed to an intermediate step 35 of local retouching by $CO_2$ laser. In our preferred mode of use, the device of local retouching by $CO_2$ laser can be used on the optical inspection bench, which allows limiting the handling of the optical component and to reduce the working duration in this step. The purpose of this local retouching step 35 is to eliminate the defects 120 considered as unacceptable (in the following of the present document, such defects are called "defects to be eliminated"), over a depth that can go up to 20 μm. During this first laser retouching step 35, a $CO_2$ laser is preferably used, whose radiation is strongly absorbed by the silica. The laser beam, whose parameters are adapted to the defect, is directed toward the defect to be eliminated, previously located and whose length and/or width have been measured. The laser melts the silica around the located defect 120, which allows restoring the qualities in the material. However, this first laser retouching step 35 deforms the optical surface 110. A polishing step 40 is than performed, so as to obtain the required surface properties: low roughness and shaping of the optical surface. After this polishing step 40, a step 50' of inspection of the polished optical surface is performed, to detect, locate and measure possible defects on the polished optical surface. If surface defects 120 are present on the polished optical surface and make the component non-compliant, instead of proceeding to a new polishing step, the optical component 100 is directed to another intermediate step 55 of local retouching by $CO_2$ laser, with the same device but with power parameters adapted to the surface defect to be eliminated. The purpose of this local retouching step 55 is to eliminate the residual surface defects or those having appeared during the polishing. The step 55 slightly deforms the optical surface 110. A conventional finishing step is then performed, whose material removal is made over a depth of about 5 μm, to reach the desired shape at the surface of the optical component. Following the finishing step 60, a step 70' of inspection of the polished optical surface is performed, to detect, locate and measure possible defects on the polished optical surface. If surface defects 120 are present on the polished optical surface and make the component non-compliant, the optical component 100 is directed to an intermediate step 75 of local retouching by $CO_2$ laser with the same device but with power parameters adapted to the surface defect to be eliminated. The purpose of this local retouching step 75 is to eliminate the residual surface defects or those having appeared during the finishing. The step 75 slightly deforms the optical surface 110. A new finishing step is then performed.

The method for reducing the size and the number of surface imperfections of an optical component will now be described.

FIG. 4 shows a device for the step 35, 55 and/or 75 of local retouching by $CO_2$ laser. The laser local retouching consists in locally remelting the material that surrounds an optical surface defect to be eliminated 120. The source 210 is preferably a $CO_2$ laser that is continuous or pulsed with a repetition frequency of the order of a few kHz. Preferably, the $CO_2$ laser is a $CO_2$ laser that emits an infrared beam 230 at an emission wavelength of 10.6 μm, which is focused using a lens 220 on the damage 120 located on the optical surface 110 of the optical component. The material of the optical component 110, which is generally silica, or a silica-based alloy, has the property of being very low-absorbent in its domain of use but high-absorbent for radiations in the far infrared. The optical component highly absorbs the energy of the beam 230 and warms up. When the glass-transition temperature, i.e. for a viscosity close to $10^{13}$ poises, is exceeded, the material locally softens. Preferably, the temperature of the glass subjected to the laser beam reaches 1200 to 1800 K. This softening allows a more or less fast reorganization of the material according to the viscosity reached, which is function of the temperature. That is during this softening that the fractures and defects disappear. The local temperature of the material has to remain lower than the temperature of ejection of the material, to avoid any loss of melt material. In particular, it is recommended to limit the warming of the silica so as not to cause the massive ejection thereof.

One particularity of the laser retouching method is to choose the parameters of this operation, such as the power density, so as to perform a remelting over all the depth of the defect but to limit the displacements of material. The remelting is a reorganization of the structure of the material. This step is a success if all the fractures of the surface defect to be eliminated have been remelted.

Advantageously, the local remelting is combined to a spatial sweep of the laser beam over the surface of the optical component along the surface defect to be eliminated.

FIG. 5 schematically shows the effect of a laser retouching on a surface defect, in a sectional view (FIG. 5A) and in a front view (FIG. 5B). The effect of the laser local remelting is to eliminate the surface defect and to produce an area of remelted material 310. Despite the precautions for limiting the power deposited, the local remelting creates, instead and in place of the defect 120, an area of remelted material having a surface deformation 310 caused by a displacement and/or a compression of material. According to the parameters of use of the $CO_2$ laser, the surface of the area of remelted material may present surface deformations having the general shape of a crater or a trench and/or surface undulations or also be close to the surface quality of a polished surface. Although the parameter settings allow obtaining a surface deformation lower than 1 μm in depth for the steps 35, 55 and 75, this surface deformation 310 is too important with respect to the flatness specifications for the surfaces of optical components for current applications.

After the $CO_2$ laser local retouching, the component resumes the conventional manufacturing process and is thus directed from the step 35 to the polishing step 40' or from the step 55 to the finishing step 60'. The various polishing and finishing processes known by the one skilled in the art may be applied to the method proposed herein. The polishing 40' allows retrieving a compliant flatness for the surface of the optical component. As the deformations applied during the $CO_2$ laser retouching are very located, the flatness of the optical component is not much affected and the parameters of the conventional manufacturing process are not modified. The material removals in the conventional process are higher than the micrometer and higher than the depth of the surface deformation 310, as schematized in FIG. 6.

As illustrated in FIGS. 6A, 6B and 6C in sectional views, the removal required for retrieving the flatness of the surface is less important when the defect has been eliminated by the $CO_2$ laser than the removal corresponding to the depth of the initial defect 120. Thanks to the use of the $CO_2$ laser during the manufacturing of the optical component, the retouching performed is both local and in depth.

FIG. 7 schematically shows a curve of measurement of the optical quality of the optical surface of an optical component as a function of the duration of the method of manufacturing (in arbitrary unit), according to a method of manufacturing detailed with reference to FIG. 1 (dash-line curve) and according to the method of the invention (full-line curve), respectively. It can be seen that the conventional iterative method does not allow reaching a perfect quality of optical surface, even with lengthening the manufacturing duration by the reiteration of the smoothing and/or polishing steps. On the contrary, the method of the invention allows reaching more rapidly an optimum optical quality. The method of the invention allows a linear sequencing of the smoothing and polishing actions, without repetition of these steps, which has the advantage to control the manufacturing costs and delays. The main advantage of the method of the invention is thus to allow the manufacturing of optical components with a better quality in a shorter time, as illustrated in FIG. 7.

The method of the invention advantageously applies to optical components made of silica glass.

Another advantage of the method of manufacturing of the invention is its compatibility with all the manufacturing processes of the manufacturers of optical components, which does not require any change of parameters in these processes.

The increase of the quality of the optical components allows improving the life duration of the optical components exposed to a high-power laser radiation. This method thus allows increasing the laser power to which is subjected the optical component on a laser chain. The other advantages of this method are its easiness and rapidity of implementation.

The main drawback of the method of the invention is that it implements non-conventional tools ($CO_2$ laser) for the polisher.

An application of the method of the invention is the production of optical components for the power laser chains. This method allows a gain of production because the optical components of non-compliant aspect can be corrected, hence a reduction of the manufacturing losses.

The invention claimed is:

1. A method of manufacturing an optical component (100) comprising a substrate made of a fusible material, said method comprising the following steps a) and b) or steps a), b) and c) or steps a), b), c) and d):
   a. Roughing (10) the optical component (100) to form at least one optical surface (110) on said substrate;
   b. Smooth grinding (20) said optical surface (110) of the optical component (100) so as to obtain a smoothed optical surface;
   c. Polishing (40) said smoothed optical surface so as to obtain a polished optical surface;
   d. Finishing (60) said polished optical surface so as to obtain a finished optical surface;
   wherein said method further comprises, after any one of steps b), and/or c), the following steps:
   e. Inspecting (30', 50', 70') the smoothed or polished optical surface of the optical component to detect and locate at least one surface defect to be eliminated (120) on the smoothed or polished optical surface of the optical component;
   f. For each surface defect to be eliminated (120) located at step e), applying a laser beam (35, 55, 75) over an area encompassing said surface defect to be eliminated, said laser beam having a laser emission wavelength suitable for being absorbed by said material, so as to produce a local remelting of the fusible material, the power density of the laser beam and the duration of application of the laser beam being function of the transverse dimensions of the surface defect to be eliminated (120), so as to form, in place of the surface defect to be eliminated, an area of laser remelted material (310); and
   g. Continuing the method of manufacturing the optical component at step c) when step f) has been performed before the end of step c); or, respectively, at step d) when step f) has been performed after the end of step c).

2. The method of manufacturing an optical component (100) according to claim 1, wherein step e) of inspection (30', 50', 70') of the optical surface of the optical component comprises a chemical etching.

3. The method of manufacturing an optical component (100) according to claim 1, wherein step e) of inspection (30', 50', 70') comprises an optical measurement of scattering and/or diffraction.

4. The method of manufacturing an optical component (100) according to claim 1, wherein step e) of inspection (30', 50', 70') comprises the detection and location of at least one surface defect (120) having a transverse dimension greater than or equal to 10 microns on the optical surface.

5. The method of manufacturing an optical component (100) according to claim 1, wherein step f) of application of a laser beam (35, 55, 75) comprises the application of a $CO_2$ laser beam at a wavelength of 10.6 µm, said laser being continuous or pulsed.

6. The method of manufacturing an optical component (100) according to claim 1, wherein the fusible material is glass and step f) of application of a laser beam (35, 55, 75) causes an increase of the local temperature of the glass, said local temperature of the glass being comprised between 1000K and 2000K in an area encompassing said surface defect to be eliminated (120) located at step e).

7. The method of manufacturing an optical component (100) according to claim 1, wherein step f) is combined to a spatial sweep of the laser beam over the surface of the optical component along the surface defect to be eliminated (120).

8. The method of manufacturing an optical component (100) according to claim 1, wherein the polishing step (40) that follows step f) comprises a material removal over a thickness lower than the depth of the initial surface defect (120) and higher than or equal to the depth of the surface deformations of the area of laser remelted material (310) generated by step f) of application of the laser beam.

9. The method of manufacturing an optical component (100) according to claim 8, wherein the material removal during the polishing step that follows step f) is comprised between 1 and 20 microns.

10. The method of manufacturing an optical component (100) according to claim 1, including a method of hardening the optical component (100) with respect to power laser radiations, said hardening method comprising the steps of:
   h. Inspecting the polished or finished optical surface (110) of the optical component (100) to detect and locate at least one surface defect to be eliminated (120) on the optical surface (110) of the optical component (100);
   i. For each surface defect to be eliminated located at step h), applying a laser beam over an area encompassing the surface defect (120), said laser beam having a laser emission wavelength suitable for being absorbed by said material, so as to produce a local remelting of the fusible material, the power density of the laser beam and the duration of application of the laser beam being function of the transverse dimensions of the surface defect to be eliminated located at step h), so as to form, in place of the surface defect to be eliminated (120), an area of laser remelted material (310);

j. Resuming the method of manufacturing the optical component at step c) of the method of claim 1 when step i) has been performed before the end of step c); or, respectively, at step d) when step i) has been performed after the end of step c).

11. The method of manufacturing an optical component (100) of claim 1, wherein said method comprises said steps a), b), and c):
  a. the step of roughing (10) the optical component (100) to form the at least one optical surface (110) on said substrate;
  b. the step of smooth grinding (20) said optical surface (110) of the optical component (100) so as to obtain the smoothed optical surface; and
  c. the step of polishing (40) said smoothed optical surface so as to obtain a polished optical surface,
  wherein said method further comprises, after at least one of the group consisting of said step b) and said step c), performing said steps e), f), and g):
  e. the step of inspecting (30', 50', 70') the smoothed or polished optical surface of the optical component to detect and locate the at least one surface defect to be eliminated (120) on the smoothed or polished optical surface of the optical component;
  f. the step of, for each surface defect to be eliminated (120) located at said step e), applying the laser beam (35, 55, 75) over the area encompassing said surface defect to be eliminated, so as to produce the local remelting of the fusible material, so as to form, in place of the surface defect to be eliminated, the area of laser remelted material (310); and
  g. the step of continuing the method of manufacturing the optical component at said step c) when said step f) has been performed before the end of said step c).

12. The method of manufacturing an optical component (100) of claim 11, wherein said method further comprises said step d), the step of finishing (60) said polished optical surface so as to obtain the finished optical surface, and
  wherein said method further comprises, after at least one of the group consisting of said step b) and said step c), performing said steps e), f), and g):
  e. the step of inspecting (30', 50', 70') the smoothed or polished optical surface of the optical component to detect and locate the at least one surface defect to be eliminated (120) on the smoothed or polished optical surface of the optical component;
  f. the step of, for each surface defect to be eliminated (120) located at said step e), applying the laser beam (35, 55, 75) over the area encompassing said surface defect to be eliminated, so as to produce the local remelting of the fusible material, so as to form, in place of the surface defect to be eliminated, the area of laser remelted material (310); and
  g. the step of i) continuing the method of manufacturing the optical component at step c) when said step f) has been performed before the end of said step c); or, respectively, ii) continuing the method of manufacturing the optical component at said step d) when said step f) has been performed after the end of said step c).

13. The method of manufacturing an optical component (100) of claim 12, wherein said step g. comprises the step of continuing the method of manufacturing the optical component at said step c) when said step f) has been performed before the end of said step c).

14. The method of manufacturing an optical component (100) of claim 12, wherein said step g. comprises the step of continuing the method of manufacturing the optical component at said step d) when said step f) has been performed after the end of said step c).

* * * * *